(12) United States Patent
Jahnke

(10) Patent No.: US 10,036,384 B1
(45) Date of Patent: Jul. 31, 2018

(54) QUICK RELEASE PISTON ROD ASSEMBLY

(71) Applicant: PREMIUM OILFIELD TECHNOLOGIES, LLC, Houston, TX (US)

(72) Inventor: Douglas Jahnke, Houston, TX (US)

(73) Assignee: PREMIUM OILFIELD TECHNOLOGIES, LLC, Houston, TX (US)

( * ) Notice: Subject to any disclaimer, the term of this patent is extended or adjusted under 35 U.S.C. 154(b) by 195 days.

(21) Appl. No.: 15/273,194

(22) Filed: Sep. 22, 2016

Related U.S. Application Data

(60) Provisional application No. 62/233,024, filed on Sep. 25, 2015.

(51) Int. Cl.
*F16J 7/00* (2006.01)
*F04B 53/14* (2006.01)
*F16J 1/12* (2006.01)

(52) U.S. Cl.
CPC ............... *F04B 53/147* (2013.01); *F16J 1/12* (2013.01); *F16J 7/00* (2013.01)

(58) Field of Classification Search
CPC .... F04B 53/14; F04B 53/144; F15B 15/1447; F15J 1/12
See application file for complete search history.

(56) References Cited

U.S. PATENT DOCUMENTS 6,164,188 A * 12/2000 Miser ..................... F04B 53/14
403/14

* cited by examiner

*Primary Examiner* — Thomas E Lazo
*Assistant Examiner* — Daniel Collins
(74) *Attorney, Agent, or Firm* — Jackson Walker, LLP

(57) ABSTRACT

The present invention provides an assembly, system, and method for a quick release piston rod assembly. The assembly includes a wedge and wedge adjuster with load transfer blocks to release quickly portions of a piston rod assembly and to allow reinsertion of those portions with a replacement piston to resume operation.

14 Claims, 9 Drawing Sheets

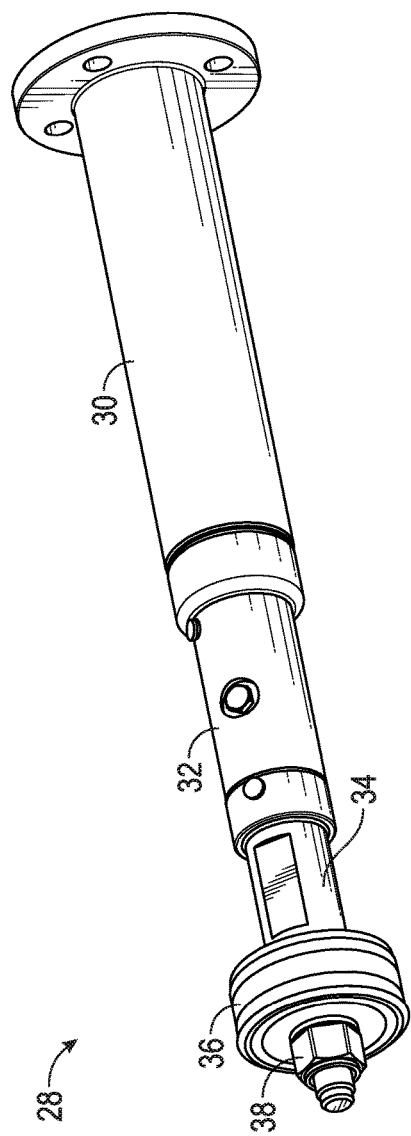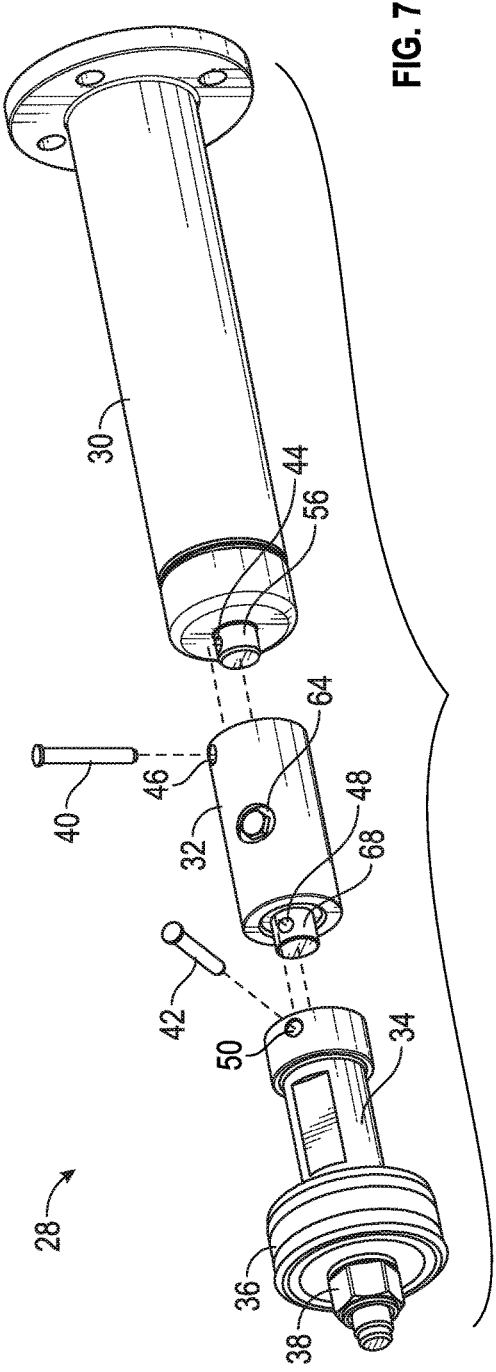

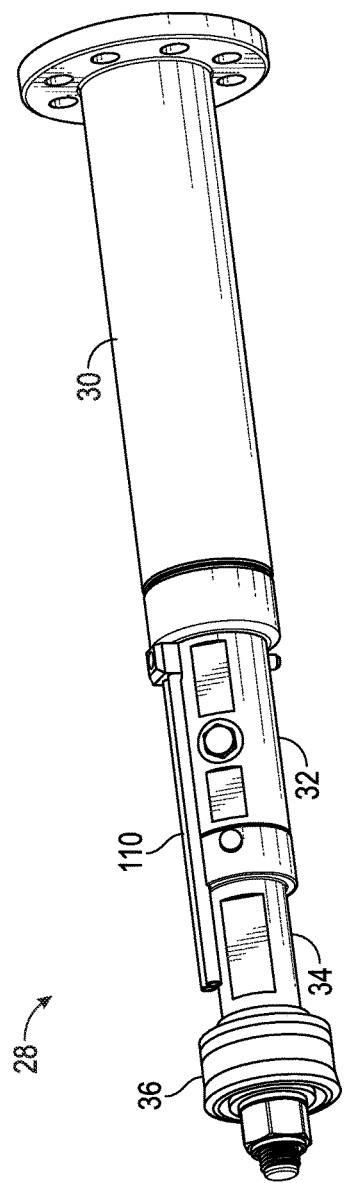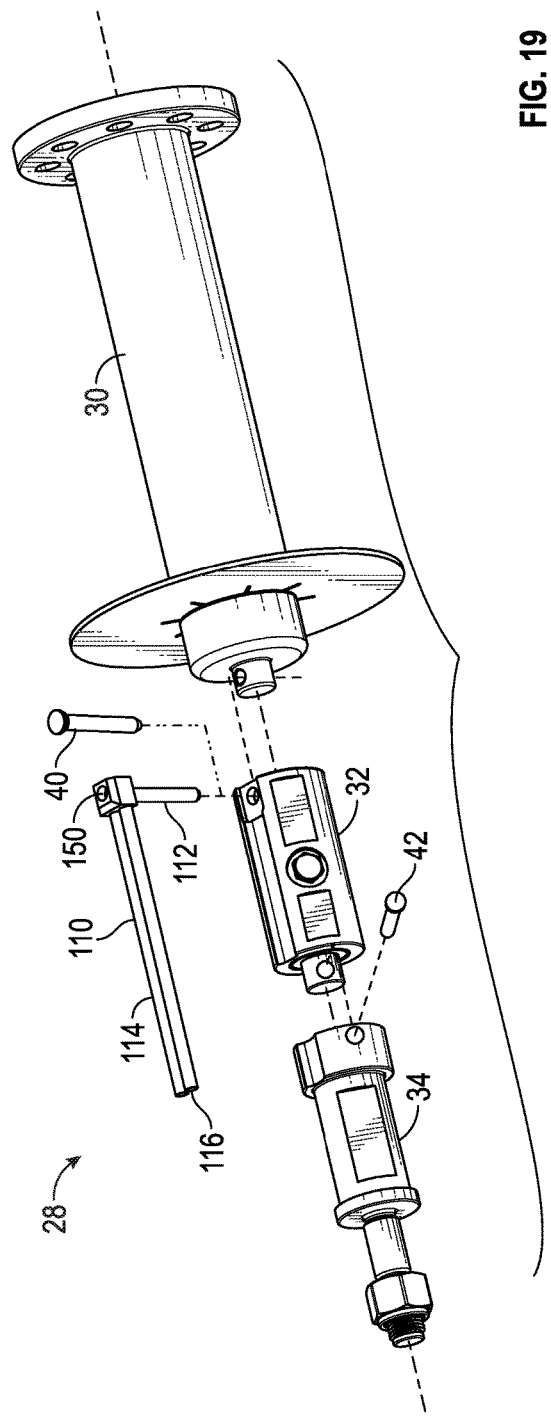

QUICK RELEASE PISTON ROD ASSEMBLY

CROSS REFERENCE TO RELATED APPLICATIONS

This application claims the benefit of U.S. Provisional Application No. 62/233,024, filed Sep. 25, 2015, which is incorporated by reference herein.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to equipment used with pistons and rods. More specifically, the disclosure relates to a quick release piston rod assembly, such as for pumps.

Description of the Related Art

The efficiency of maintenance on equipment such as oilfield equipment can have a dramatic impact on profitability. A faster repair and restart of operation can be valuable. One area of need is to change quickly a piston rod in equipment that wears out pistons. To change the piston, the rod holding the piston needs to be released.

FIG. 1 is a schematic perspective view of an exemplary known pump assembly having power end and fluid end. FIG. 2 is a schematic cross sectional view of the known pump assembly of FIG. 1. FIG. 3 is a schematic cross sectional view of an exemplary pump rod assembly with the fluid end shown in FIG. 2. The pump assembly 2 generally includes a power end 4 coupled with a fluid end 6. The power end can include an engine, motor, or other prime mover. The fluid end can include inlets, outlets, valves, and flow paths. A piston rod assembly 8 with a piston 18 couples the power end 4 with the fluid end 6 and reciprocates within a cylinder 24 to alternatively pull fluid into the pump end 6 and then push the fluid through the pump end.

FIG. 4 is a schematic perspective view of the pump rod assembly of FIG. 3. FIG. 5 is a schematic cross sectional view of the pump rod assembly of FIG. 4. The piston rod assembly 8 includes a pony rod 10 that is coupled to a sub rod 12 with a clamp 14. The sub rod 12 is coupled with a piston rod 16 through a connecting stud 22. A piston 18 is coupled to an end of the piston rod 16 and fastened with a connecting stud 22 to the piston rod.

To change a worn piston 18, a service person must remove the clamp 14. The piston rod assembly 8 is retracted to provide clearance for removal of the piston. The sub rod 12 and the piston rod 16 are disconnected by unthreading from the connecting stud 22. The piston rod 16 can be pulled out of the pump assembly to replace the piston. The reverse procedure can be applied to reinstall a replacement piston into the pump assembly 2, and connect with the sub rod 12 and the pony rod 10.

There remains a need for an improved pump rod assembly and method of changing a piston in the pump rod assembly. The present invention offers such a solution.

BRIEF SUMMARY OF THE INVENTION

The present invention provides an assembly, system, and method for a quick release piston rod assembly. The assembly includes a wedge and wedge adjuster with load transfer blocks to release quickly portions of a piston rod assembly and to allow reinsertion of those portions with a replacement piston to resume operation.

A quick release piston rod assembly, comprising: a pony rod formed with a connection opening; a sub rod formed with a first connection opening that is configured to align with the pony rod connection opening and a second connection opening on a distal end from the first connection opening; and a piston rod formed with a connection opening that is configured to align with the connection opening through a second load transfer block of the sub rod. The sub rod comprises: a wedge block; a first load transfer block formed with a first end portion having a transfer extension extending outwardly from a longitudinal axis, a second end portion having a shoulder distal from the first end portion, and a central portion between the end portions with a wedge opening formed through the central portion transverse to the longitudinal axis; a second load transfer block formed with a first end portion having a transfer extension extending outwardly from a longitudinal axis, a second end portion having a shoulder distal from the first end portion, and a central portion that is formed to align with the central portion in the first load transfer block, a wedge opening formed through the central portion transverse to the longitudinal axis, the wedge opening being formed to align with the wedge opening in the first load transfer block; the first load transfer block and the second load transfer block being formed to engage each other so that the transfer extension of the first load transfer block is insertable into the wedge opening of the second load transfer block, and the transfer extension of the second load transfer block is insertable into the wedge opening of the first load transfer block distally from the transfer extension of the first transfer block, and the wedge block is slidably engageable between the two transfer extensions in at least one of the wedge openings; a housing sized to at least partially surround a longitudinal portion of the first load transfer block and the second load transfer block when engaged together and having an adjuster opening formed transversely through the housing to align with the wedge block; and a wedge adjuster configured to be insertable into the adjuster opening of the housing to move the wedge block transversely to the longitudinal axis with actuation of the wedge adjuster.

A quick release piston rod assembly, comprising: a pony rod formed with a connection opening; a sub rod formed with a first connection opening that is configured to align with the pony rod connection opening and a second connection opening on a distal end from the first connection opening; and a piston rod formed with a connection opening that is configured to align with the connection opening through a second load transfer block of the sub rod, and a distal portion from the piston rod connection opening that is configured to receive a piston. The sub rod comprises: a wedge block having an adjuster opening formed therein; a first load transfer block formed with a first end portion having a transfer extension extending outwardly from a longitudinal axis with a shaped surface to slidably engage the wedge block, a second end portion having a shoulder distal from the first end portion, and a recessed central portion adjacent to the shoulder and having a smaller cross section than the end portions with a wedge opening formed through the central portion transverse to the longitudinal axis; a second load transfer block formed with a first end portion having a transfer extension extending outwardly from a longitudinal axis with a shaped surface to slidably engage the wedge block, a second end portion having a shoulder distal from the first end portion, and a recessed central portion adjacent to the shoulder that is formed to align with the recessed central portion in the first load transfer block and having a smaller cross section than the end portions, a wedge opening formed through the central portion transverse to the longitudinal axis, the wedge opening being formed to align with the wedge opening in the first load transfer block; the first load transfer block and the second load transfer block being formed to engage each other so that the transfer extension of the first load transfer block is insertable into the wedge opening of the second load transfer block, and the transfer extension of the second load transfer block is insertable into the wedge opening of the first load transfer block distally from the transfer extension of the first transfer block, and the wedge block is slidably engageable between the two transfer extensions in at least one of the wedge openings; a housing sized to at least partially surround a longitudinal portion of the first load transfer block and the second load transfer block when engaged together and having an adjuster opening formed transversely through the housing to align with the adjuster opening in the wedge block; and a wedge adjuster configured to be insertable into the adjuster opening of the housing and the adjuster opening of the wedge block to move the wedge block transversely to the longitudinal axis with actuation of the wedge adjuster and to expand a length of the sub rod when actuated one direction and to allow contraction of the length of the sub rod when actuated a second direction different from the first direction.

BRIEF DESCRIPTION OF THE SEVERAL VIEWS OF THE DRAWINGS

FIG. 6 is a schematic perspective view of an exemplary pump rod assembly according to the invention.

FIG. 7 is a schematic assembly view of the exemplary pump rod assembly of FIG. 6.

FIG. 18 is a schematic perspective view of an alternative embodiment of a pump rod assembly according to the invention.

FIG. 19 is a schematic assembly view of the pump rod assembly shown in FIG. 18.

DETAILED DESCRIPTION

Figure 1:
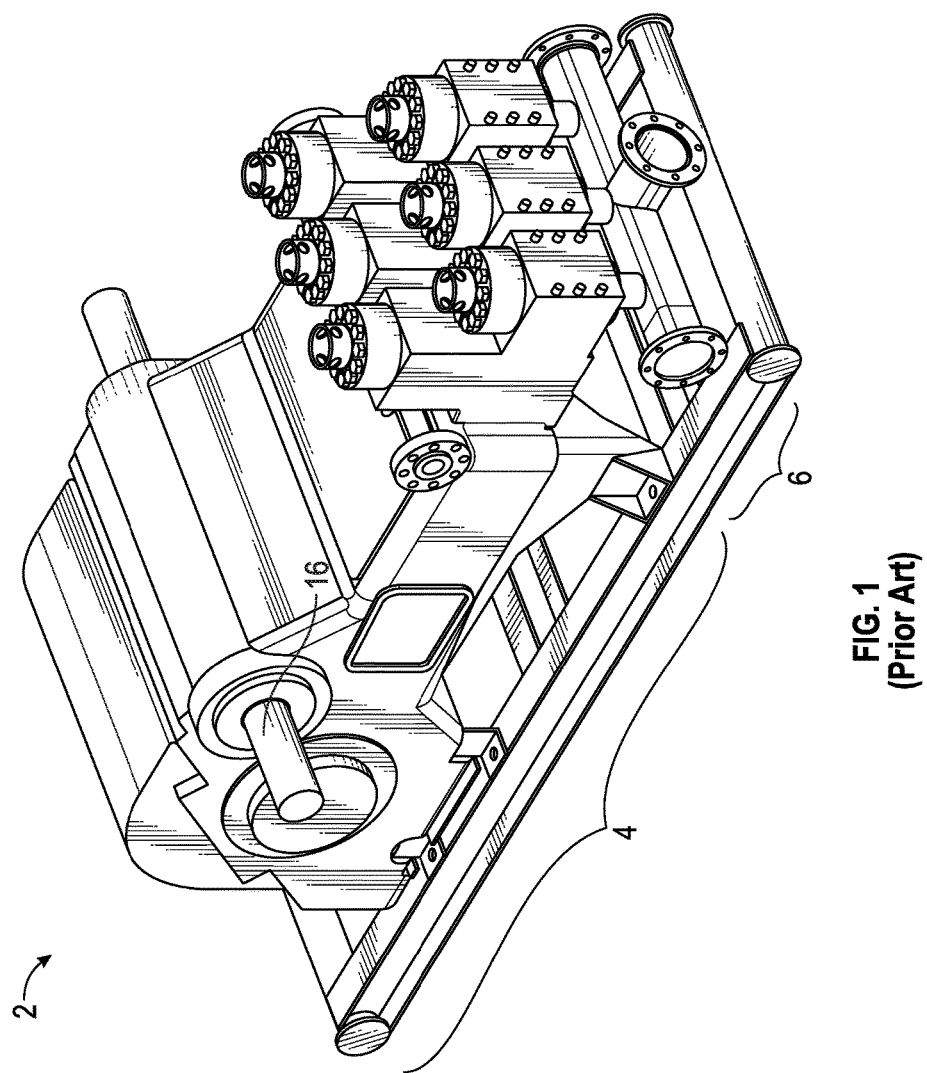
FIG. 1 is a schematic perspective view of an exemplary known pump assembly having power end and fluid end.
Figure 2:
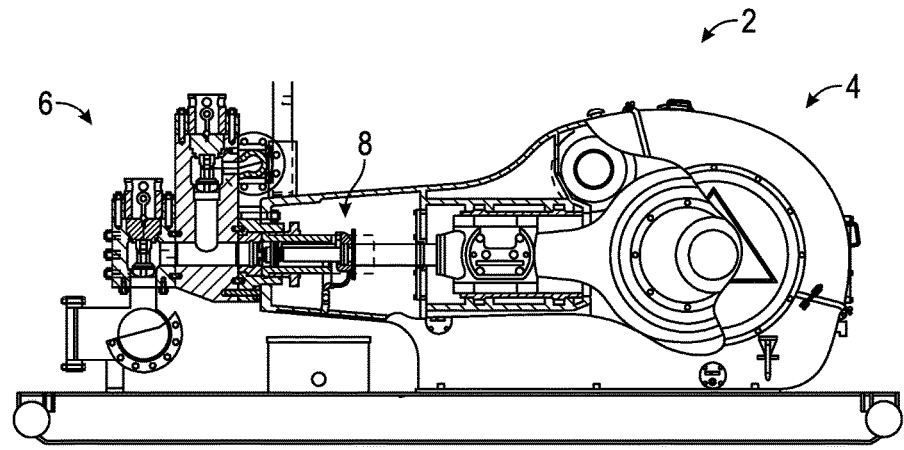
FIG. 2 is a schematic cross sectional view of the known pump assembly of FIG. 1.
Figure 3:
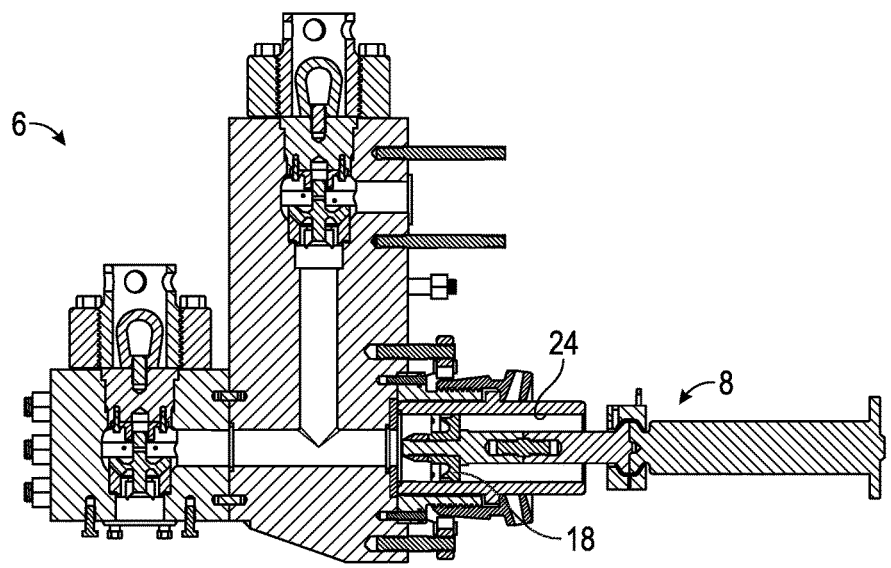
FIG. 3 is a schematic cross sectional view of an exemplary pump rod assembly with the fluid end shown in FIG. 2.
Figure 4:
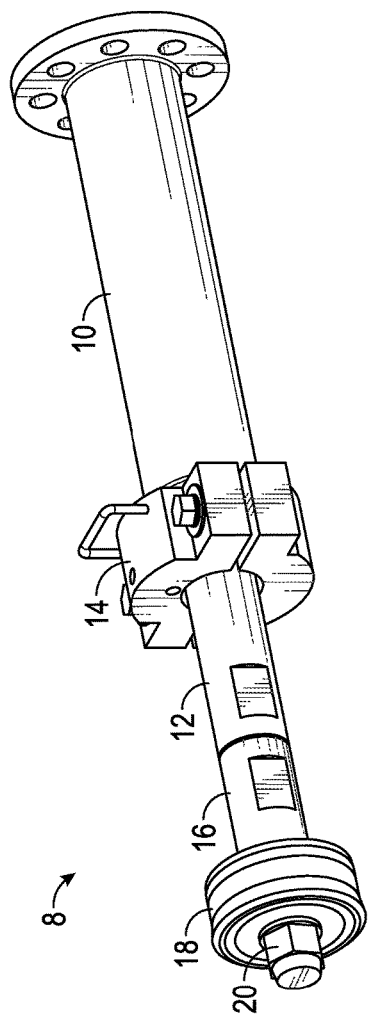
FIG. 4 is a schematic perspective view of the pump rod assembly of FIG. 3.
Figure 5:
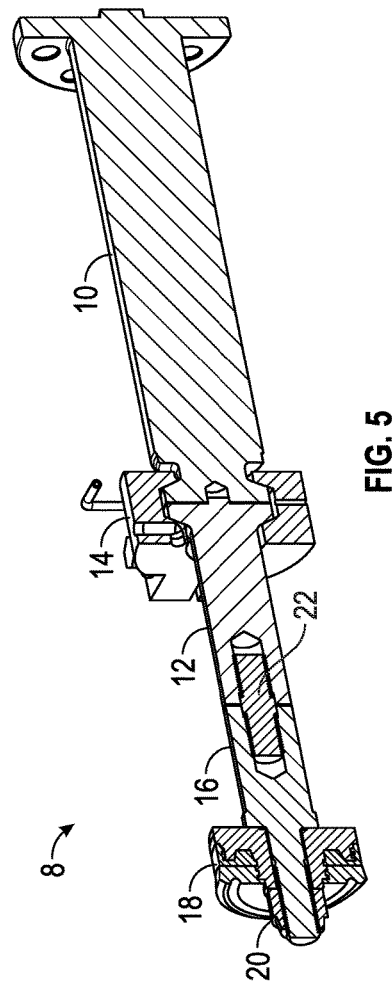
FIG. 5 is a schematic cross sectional view of the pump rod assembly of FIG. 4.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The present invention provides an assembly, system, and method for a quick release piston rod assembly. The assembly includes a wedge and wedge adjuster with load transfer blocks to release quickly portions of a piston rod assembly and to allow reinsertion of those portions with a replacement piston to resume operation.

FIG. 6 is a schematic perspective view of an exemplary pump rod assembly according to the invention. FIG. 7 is a schematic assembly view of the exemplary pump rod assembly of FIG. 6. The piston rod assembly of the present invention includes three subparts: a pony rod 30, a sub rod 32, and a piston rod 34 that can be coupled with a piston 36. The pony rod 30 includes a connector 56 disposed toward an end of the pony rod. The connector is formed with a connection opening 44 through which a fastener, termed herein a "connection pin" 40 can be inserted therein. The pony rod can be coupled with the sub rod 32. The sub rod includes a connection opening 46 that is formed to align with the connection opening 44 in the pony rod 30. The sub run further includes a connection opening 48 on a distal and from the connection opening 46. The connection opening 48 can be formed through a connector 68. A connection pin 42 can be inserted through the connection opening 48. A wedge adjuster 64 can be inserted into the sub rod 32 to adjust the length of the sub rod and couple the components. More details of the sub rod will be described below. The connector 68 is configured to couple the sub rod with the piston rod 34. The piston rod 34 is formed with a connection opening 50, which can be aligned with the connection opening 48 for the connection pin 42 to be inserted therein. The piston rod 34 can be coupled with a piston 36 held in place on the piston rod with a fastener 38 that is distal from the connection opening 50.

Figure 8:
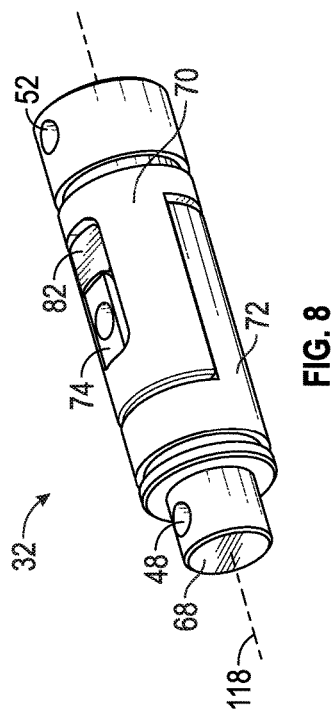
FIG. 8 is a schematic perspective view of an exemplary assembly of components of a sub rod according to the invention.
Figure 9:
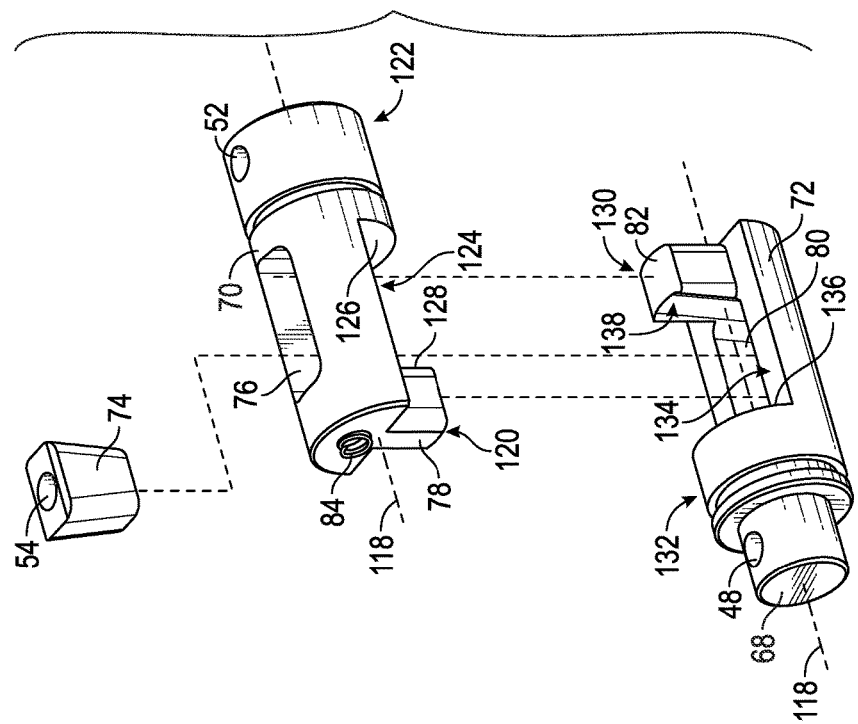
FIG. 9 is a schematic assembly view of the components of the sub rod of FIG. 8.
Figure 10:
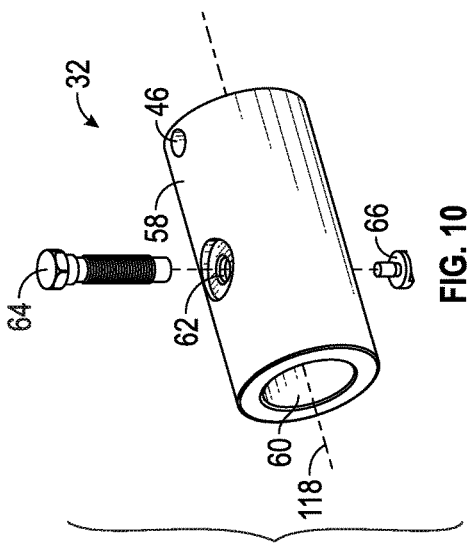
FIG. 10 is a schematic perspective view of an exemplary housing for the components of the sub rod of FIG. 8.

FIG. 8 is a schematic perspective view of an exemplary assembly of components of a sub rod according to the invention. FIG. 9 is a schematic assembly view of the components of the sub rod of FIG. 8. FIG. 10 is a schematic perspective view of an exemplary housing for the components of the sub rod of FIG. 8. The sub rod 32 generally includes a first load transfer block 70 engageable with a second load block 72 with a wedge block 74 insertable in a wedge opening therebetween. The load transfer blocks can be at least partially surrounded by a housing 58 with a bore 60. An adjuster 64 can be inserted through an adjuster opening 62 that engages an adjuster opening 54 in the wedge block 74 to move the wedge block transversely to a longitudinal axis 118.

In more detail, the first load transfer block 70 includes a first end portion 120 and a second end portion 122, and a central portion 124 disposed therebetween. The central portion 124 is generally recessed and has a smaller cross-section than the end portions. A wedge opening 76 is formed through the central portion transverse to the longitudinal axis 118 through the transfer block. The first end portion 120 can include a transfer extension 78 that extends outwardly from longitudinal axis further than the central portion 124. The transfer extension 78 can include a shaped surface 128 that can align with a tapered surface on the wedge block 74. The first end portion can also include a bias element 84, such as a coiled spring or leaf spring, which can bias the first load transfer block 70 away from an adjoining surface. The second end portion 122, distal from the first end portion 120, can include a shoulder 126 that is distal from the first end portion. Generally, the shoulder 126 will be adjacent the central portion 124. The second end portion 122 further includes a connection opening 52 formed therein. The connection opening 52 can align with the connection opening 46 in the housing 58. When aligned, the connection pin 42 can be inserted therethrough to couple the housing 58 and the first load transfer block 70 of the sub rod 32 with the pony rod 30, described above.

The sub rod 32 also includes a second load transfer block 72. The second load transfer block has some similarities with the first transfer block. The second load transfer block also includes a first end portion 130, a second end portion 132, and a central portion 134 disposed therebetween. The central portion 134 can be recessed with a smaller cross-section than the end portions and be formed with a wedge opening 80 through the central portion transverse to the longitudinal axis 118. The first end portion 130 includes a transfer extension 82. The transfer extension 82 can be formed with a shaped surface 138 to engage the wedge block 74 when inserted in the wedge opening 80. The second end portion 132, distal from the first end portion 130, can include a shoulder 136 that is distal from the first end portion. The second end portion 132 can further include a connector 68 having a connection opening 48 formed therethrough. The connector 68 of the second load transfer block 72 can be used to couple the second end portion 132 of the second load transfer block 72 with the pump piston rod 34. When the connection opening 48 is aligned with the connection opening 50 of the piston rod 34, the connection pin 42 can be inserted therethrough.

When the first load transfer block is assembled with the second load transfer block, the central portion 134 can align with the central portion 124 and the wedge opening 80 can align with the wedge opening 76. The transfer extension 78 of the first load transfer block 70 can extend into the wedge opening 80 of the second load transfer block 72. Similarly, the transfer extension 82 of the second load transfer block 72 can extend into the wedge opening 76 of the first load transfer block 70. The wedge block 74 can be inserted into the space between the transfer extensions. The bias element 84 of the first end portion 120 of the first load transfer portion 70 can bias the second load transfer block 72 apart from the shoulder 126 on the first load transfer block 70. A similar bias element 98 (shown in FIG. 12) on the corresponding first end portion 130 of the second load transfer block 72 can bias the first load transfer block 70 apart from the shoulder 136 of the second load transfer block 72.

Housing 58 is sized to at least partially surround a longitudinal portion of the first load transfer block 70 and the second load transfer block 72 when engaged together. The housing is formed with an adjuster opening 62 formed transversely through the housing to align with the adjuster opening 54 in the wedge block 74. When a wedge adjuster 64 is inserted through the adjuster opening 62, a retainer 66 can be coupled with the end of the wedge adjuster 64. The wedge adjuster 64 can include external threads there helically formed thereon. Similarly, the adjuster opening 54 of the wedge block 74 can include corresponding helically-formed internal threads. In at least one embodiment, by turning the wedge adjuster 64 clockwise or counterclockwise, the wedge 74 can move in a transverse direction to the longitudinal axis 118 and expand or allow contraction of the space between the transfer extensions 78 and 82.

Figure 11:
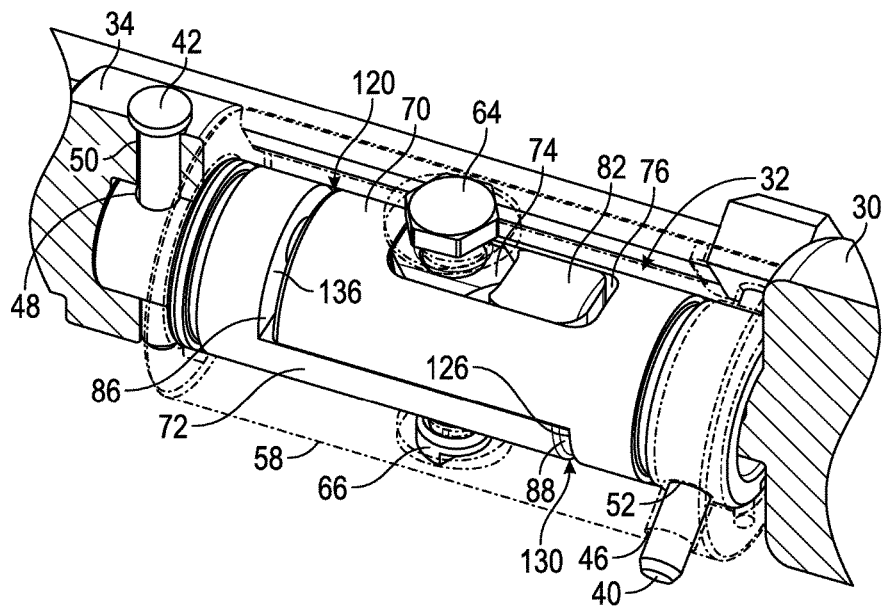
FIG. 11 is a schematic perspective the pump rod assembly having the sub rod in an expanded position.
Figure 12:
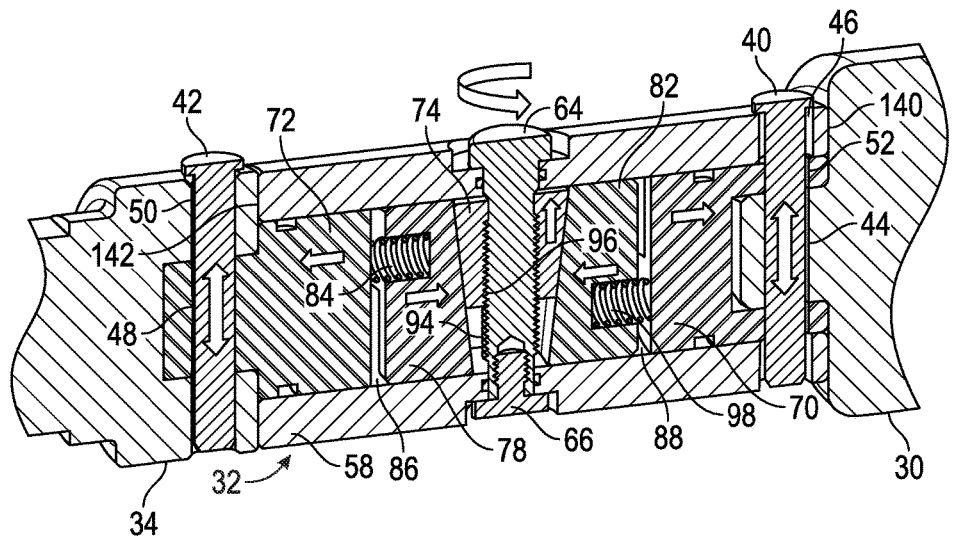
FIG. 12 is a schematic cross sectional view of the pump rod assembly having the sub rod in the expanded position.

FIG. 11 is a schematic perspective the pump rod assembly having the sub rod in an expanded position. FIG. 12 is a schematic cross sectional view of the pump rod assembly having the sub rod in the expanded position. These figures illustrate the interaction of the components in the coupling thereof and is a position in which the components can be readily disassembled and assembled. The pony rod 30 can be coupled to the sub rod 32 with the connection pin 40 inserted through the connection opening 46 in the housing 58, the connection opening 52 in the first load transfer block 70, and the corresponding connection opening 44 in the pony rod (shown in FIG. 7). The piston rod 34 can be coupled to the sub rod 32 on the distal end the from the pony rod by the connection pin 42 inserted through the connection opening 50 in the piston rod and the connection opening 48 in the second load transfer block 72. In this position, there is sufficient clearance between the connection openings 44, 46, and 52 for the connection pin 40 to be inserted therethrough. Similarly, there is sufficient clearance in the connection openings 50 and 48 for the pin 42 to be readily inserted. The end of the pony rod 30 can be in at least close proximity to the end of the sub rod 32 at the interface 140, and the end of the piston rod 34 can be in at least close proximity to the other end of the sub rod at the interface 142.

A gap 86 can be formed between the shoulder 136 of the second load transfer block 72 and the first end portion 120 of the first load transfer block 70. Similarly, a gap 88 can be formed between the shoulder 126 of the first load transfer block 70 and the first end portion 130 of the second load transfer block 72. The transverse position of the wedge block 74 within at least one of the wedge openings 76, 80 (described above) and interface with the transfer extensions 78 and 82 affects the available size of the gaps. The wedge block 74 can be adjusted to a position with the wedge adjuster 64 to minimize a spacing between the transfer extension 78 and the transfer extension 82 of the load transfer blocks to allow a larger gap than if the wedge block is adjusted down in the orientation shown in FIGS. 13 and 14, described below. The available longitudinal movement caused by the wedge block position and gaps are generally at least as much as the largest clearance in the connection openings for the connection pins 40 and 42. In at least one embodiment, the wedge adjuster 64 can include external helical threads 94 that can engage corresponding internal threads 96 on the wedge block for use in adjusting the transverse location of the wedge block 74. The bias elements 86 and 98 bias the components apart to help form gaps 86 and 88.

Figure 13:
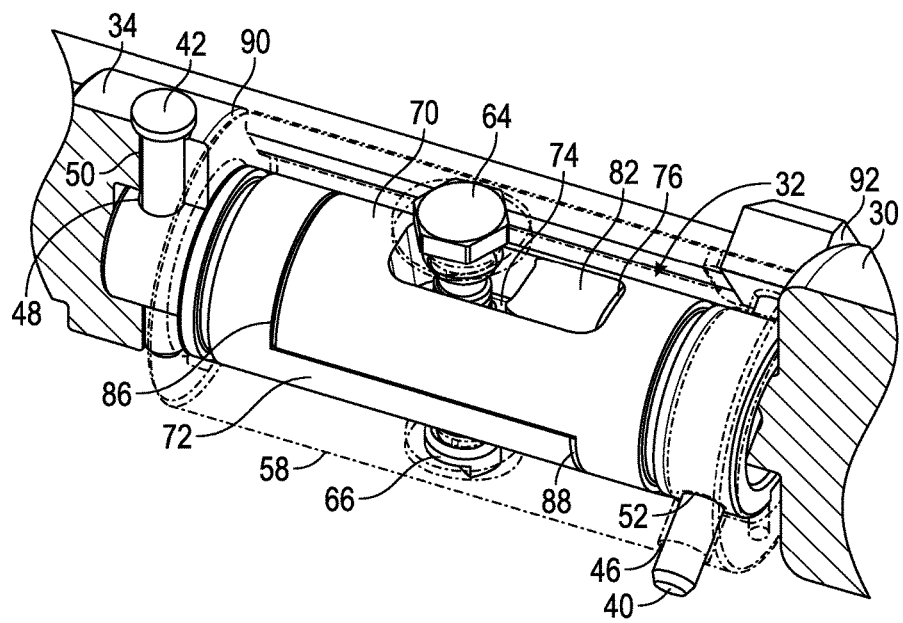
FIG. 13 is a schematic perspective the pump rod assembly having the sub rod in an engaged position.
Figure 14:
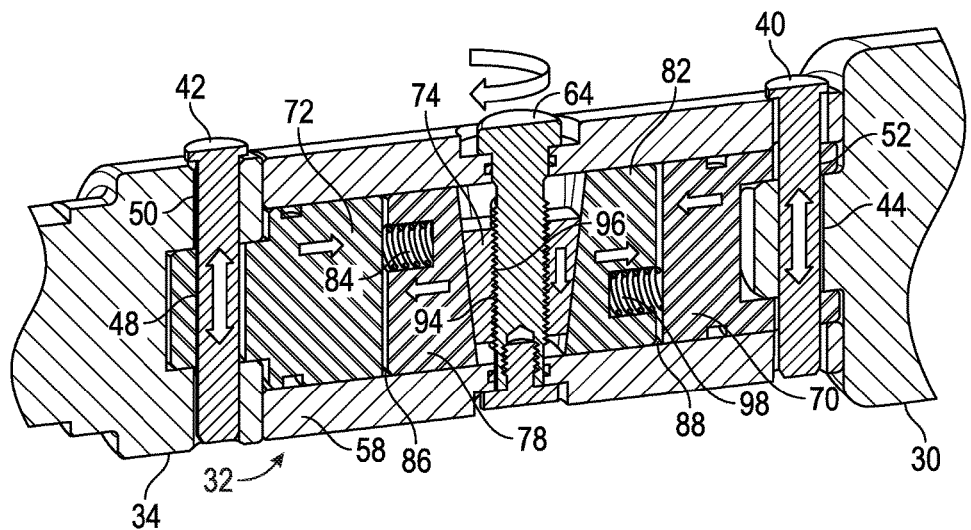
FIG. 14 is a schematic cross sectional view of the pump rod assembly having the sub rod in the engaged position.

FIG. 13 is a schematic perspective the pump rod assembly having the sub rod in an engaged position. FIG. 14 is a schematic cross sectional view of the pump rod assembly having the sub rod in the engaged position. By actuating the wedge adjuster 64, such as by turning, the wedge adjuster 64 causes the wedge block 74 to transversely move the spacing between the transfer extensions 78 and 82. The movement of the transfer extension 78 of the first load transfer block is in the opposite direction of the movement of the transfer extension 82 of the second load transfer block 72. The opposite directional movement shortens the overall length of the assembly of the first load transfer block 70 with the second load transfer block 72 has seen by reducing the size of the gaps 86 and 88. Because the length of the housing 58 does not change by the internal movement of the first load transfer block and second load transfer blocks, the sub rod pulls the pony rod 30 and the piston rod 34 into a tighter coupling with the sub rod 32.

The clearance between the connection openings 44 and 52 of the sub rod and pony rod, and between the connection openings 48 and 50 of the sub rod and piston rod that existed prior to such movement are thereby reduced, pinching the connection pins 40 and 42 in position. Specifically, the longitudinal movement of the first load transfer block 70 by the wedge block 74 movement pulls the connection pin 40 closer to the surface of the connection opening 52 on one side of the connection pin and to the surface of the connection opening 44 on the other side of the connection pin. When the surfaces of the connection opening 52 and the connection opening 44 are engaged on opposite sides of the connection pin 40, then the relative movement of the first load transfer block 70 and the pony rod 30 stops, thereby pinching the connection pin between the surfaces of the connection openings in relative position. Further movement of the connection pin 40 moves the first load transfer block 70 and the pony rod 30 relative to the sub rod housing 58 and the inner surface of the housing connection opening 46. Generally, the connection opening 46 is sized to allow sufficient clearance for the connection pin 40, so that the sub rod housing 58 and the pony rod 30 can contact each other at the interface 140 as or before the wedge block 74 has no further transverse travel or the gaps 86 or 88 between the load transfer blocks become closed and allow no further longitudinal travel.

Similarly, the longitudinal movement of the second load transfer block 72 by the wedge second block 74 movement pulls the connection pin 42 closer to the surface of the connection opening 48 on one side of the connection pin and to the surface of the connection opening 50 on the other side of the connection pin. When the surfaces of the connection opening 48 and the connection opening 50 are engaged on opposite sides of the connection pin 42, then the relative movement of the second load transfer block 72 and the piston rod 34 stops, thereby pinching the connection pin between the surfaces of the connection openings in relative position. Further movement of the connection pin 42 moves the second load transfer block 72 and the piston rod 34 relative to the sub rod housing 58, so that the sub rod and the piston rod can contact each other at the interface 142 as or before the wedge block 74 has no further transverse travel or the gaps 86 or 88 between the load transfer blocks become closed and allow no further longitudinal travel.

Figure 15:
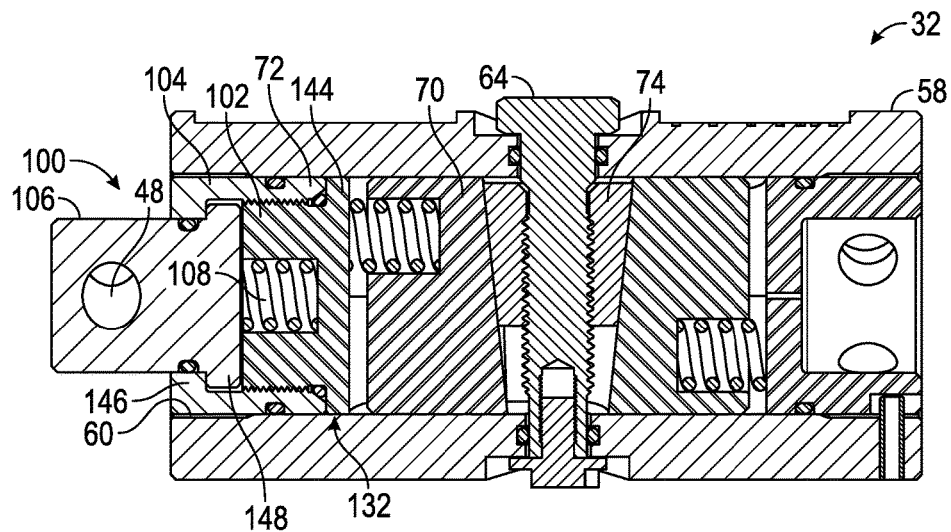
FIG. 15 is a schematic cross sectional view of an alternative sub rod of the invention having a swivel end connector.
Figure 16:
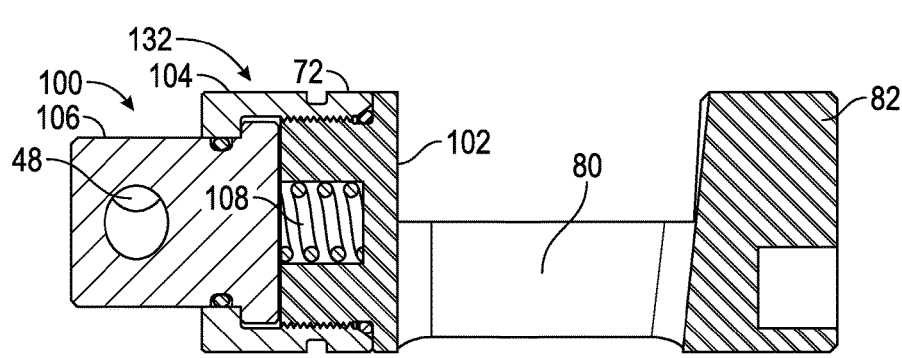
FIG. 16 is a schematic cross sectional view of a load transfer block of the swivel end connector shown in FIG. 15.
Figure 17:
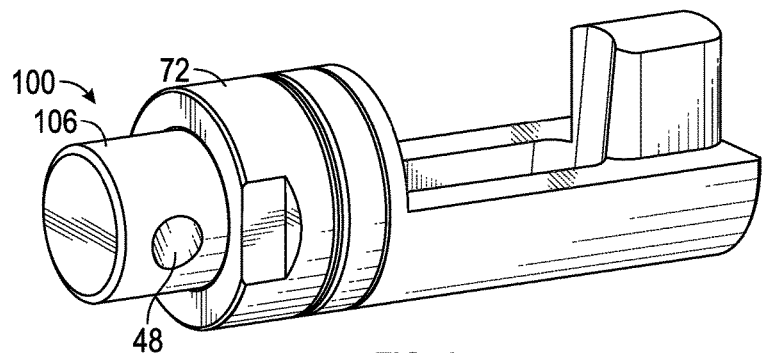
FIG. 17 is a schematic perspective view of a load transfer block shown in FIG. 16.

FIG. 15 is a schematic cross sectional view of an alternative sub rod of the invention having a swivel end connector. FIG. 16 is a schematic cross sectional view of a load transfer block of the swivel end connector shown in FIG. 15. FIG. 17 is a schematic perspective view of a load transfer block shown in FIG. 16. The embodiment of the sub rod 32 with a swivel end connection 100 includes a second load transfer block 72, similar to the embodiment described above. The second end portion 132 of the second load transfer block 72 includes a connector body 102. A connector collar 104 can be fixedly coupled to the internal bore 60 of the housing 58 and longitudinally restrain the connector body 102 within the housing bore. For example, an end of the connector collar 104 within the bore 60 can abut an external peripheral shoulder 144 on the connector body 102 to restrain the connector body. A connector member 106, having a connection opening 48, can be longitudinally coupled and rotationally uncoupled to the connector collar 104, allowing the connector member to rotate within the connector collar. The connector collar 104 can include an internal peripheral shoulder 146 on a bore of the connector collar to restrain a corresponding external peripheral shoulder 148 on the connector member 106 that restricts the longitudinal movement of the connector member and allows the connector member to rotate therein. A bias element 108 provides a bias force between the connector body 102 and the connector member 106 with clearance therebetween to assist in rotatability.

FIG. 18 is a schematic perspective view of an alternative embodiment of a pump rod assembly according to the invention. FIG. 19 is a schematic assembly view of the pump rod assembly shown in FIG. 18. The piston rod assembly 28 is similar to the above-described piston rod assembly, and generally includes the pony rod 30, the sub rod 32, and the piston rod 34 that can be coupled with a piston 36. In this embodiment, at least one of the pins is replaced with a variation that includes a cooling assembly 110. The cooling assembly 110 can include a connecting pin 112 that can be similar to the above-described connecting pin 40 to be inserted in the relevant connection openings described above. The cooling assembly 110 further includes a cooling arm 114 coupled to the connecting pin 112. The cooling arm 110 can include an inlet port 150 fluidicly coupled to an outlet port 116. In operation, the piston rod assembly 28 can be assembled in a manner as described above using the cooling assembly 110 and the connecting pin 112 in lieu of the connecting pin 40 (or other connecting pin such as connecting pin 42). During use, a cooling fluid source (not shown) can be coupled to the inlet port 150 to flow a cooling fluid through the cooling arm 114 and exit the outlet port 116. In some embodiments, the flow through the flow port 116 can be directed toward the piston 36.

Other and further embodiments utilizing one or more aspects of the invention described above can be devised without departing from the spirit of Applicant's invention. For example, various configurations of end portions, transfer extensions, springs, and other components can be formed, and associated methods of use and manufacture, along with other variations can occur in keeping within the scope of the claims.

The invention has been described in the context of preferred and other embodiments and not every embodiment of the invention has been described. Obvious modifications and includes a swivel end connector 100 alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A quick release piston rod assembly, comprising:
   a pony rod formed with a connection opening;
   a sub rod formed with a first connection opening that is configured to align with the pony rod connection opening and a second connection opening on a distal end from the first connection opening and comprising:
   a wedge block;
   a first load transfer block formed with a first end portion having a transfer extension extending outwardly from a longitudinal axis, a second end portion having a shoulder distal from the first end portion, and a central portion between the end portions with a wedge opening formed through the central portion transverse to the longitudinal axis,
   a second load transfer block formed with a first end portion having a transfer extension extending outwardly from a longitudinal axis, a second end portion having a shoulder distal from the first end portion, and a central portion that is formed to align with the central portion in the first load transfer block, a wedge opening formed through the central portion transverse to the longitudinal axis, the wedge opening being formed to align with the wedge opening in the first load transfer block;
   the first load transfer block and the second load transfer block being formed to engage each other so that the transfer extension of the first load transfer block is insertable into the wedge opening of the second load transfer block, and the transfer extension of the second load transfer block is insertable into the wedge opening of the first load transfer block distally from the transfer extension of the first transfer block, and the wedge block is slidably engageable between the two transfer extensions in at least one of the wedge openings;
   a housing sized to at least partially surround a longitudinal portion of the first load transfer block and the second load transfer block when engaged together and having an adjuster opening formed transversely through the housing to align with the wedge block; and
   a wedge adjuster configured to be insertable into the adjuster opening of the housing to move the wedge block transversely to the longitudinal axis with actuation of the wedge adjuster; and
   a piston rod formed with a connection opening that is configured to align with the connection opening through the second load transfer block of the sub rod.

2. The assembly of claim 1, wherein the first load transfer block of the sub rod is formed with a connection opening through at least one of the first load transfer block end portions and further comprising a first connection pin configured to be inserted into the pony rod connection opening and the connection opening through the first load transfer block to couple the pony rod with the sub rod.

3. The assembly of claim 2, wherein the second load transfer block of the sub rod is formed with a connection opening through at least one of the second load transfer block end portions distal from the connection opening in the first load transfer block and further comprising a second connection pin configured to be inserted into the connection opening through the second load transfer block of the sub rod and the piston rod to couple the sub rod with the piston rod.

4. The assembly of claim 3, wherein the connection pins are pressed against surfaces of the openings in which the pins are disposed when the assembly is activated to a closed position with the wedge moved to a position that expands a spacing between the transfer extensions of the load transfer blocks.

5. The assembly of claim 1, wherein the central portion of at least one of the load transfer blocks has a smaller cross section that at least one of the end portions.

6. The assembly of claim 1, wherein the wedge block is formed with an adjuster opening therein, the adjuster opening being formed with helical internal threads and the wedge adjuster is formed with corresponding helical external threads to adjust the wedge block transversely in at least one of the wedge openings.

7. The assembly of claim 1, wherein when the first load transfer block and the second load transfer block are engaged with each other, the shoulder of the second end portion of the first transfer block is adjacent the end of the first end portion of the second transfer block, and the shoulder of the second end portion of the second transfer block is adjacent the end of the first end portion of the first transfer block, and further when the wedge adjuster is in a first transverse position in the wedge opening, a first gap is formed between the shoulders and the end portions, and when the wedge adjuster is in a second transverse position in the wedge opening, a second gap of a different size than the first gap is formed between the shoulders and the end portions.

8. The assembly of claim 7, further comprising a compressive spring disposed between the shoulder of one of the load transfer blocks and the adjacent end of the other load transfer block.

9. The assembly of claim 1, wherein at least one of the load transfer blocks comprises a swivel end connector comprising a connector collar coupled to the second end portion of the at least one of the load transfer blocks, and a connector member longitudinally coupled and rotationally uncoupled to the connector collar.

10. The assembly of claim 1, further comprising a cooling assembly, the cooling assembly having a connection pin coupled to a cooling arm formed with a flow port, the connection pin configured to be engageable in at least one of the connection openings, and the flow port configured to flow coolant to at least a portion of the assembly.

11. The assembly of claim 1, wherein the wedge adjuster is configured to expand a length of the sub rod when actuated one direction and to allow contraction of the length of the sub rod when actuated a second direction different from the first direction.

12. The assembly of claim 1, wherein a distal portion of the piston rod from the piston rod connection opening is configured to receive a piston and further comprising the piston.

13. A quick release piston rod assembly, comprising:
a pony rod formed with a connection opening;
a sub rod formed with a first connection opening that is configured to align with the pony rod connection opening and a second connection opening on a distal end from the first connection opening and comprising:
 a wedge block having an adjuster opening formed therein;
 a first load transfer block formed with a first end portion having a transfer extension extending outwardly from a longitudinal axis with a shaped surface to slidably engage the wedge block, a second end portion having a shoulder distal from the first end portion, and a recessed central portion adjacent to the shoulder and having a smaller cross section than the end portions with a wedge opening formed through the central portion transverse to the longitudinal axis,
 a second load transfer block formed with a first end portion having a transfer extension extending outwardly from a longitudinal axis with a shaped surface to slidably engage the wedge block, a second end portion having a shoulder distal from the first end portion, and a recessed central portion adjacent to the shoulder that is formed to align with the recessed central portion in the first load transfer block and having a smaller cross section than the end portions, a wedge opening formed through the central portion transverse to the longitudinal axis, the wedge opening being formed to align with the wedge opening in the first load transfer block;
 the first load transfer block and the second load transfer block being formed to engage each other so that the transfer extension of the first load transfer block is insertable into the wedge opening of the second load transfer block, and the transfer extension of the second load transfer block is insertable into the wedge opening of the first load transfer block distally from the transfer extension of the first transfer block, and the wedge block is slidably engageable between the two transfer extensions in at least one of the wedge openings;
 a housing sized to at least partially surround a longitudinal portion of the first load transfer block and the second load transfer block when engaged together and having an adjuster opening formed transversely through the housing to align with the adjuster opening in the wedge block; and
 a wedge adjuster configured to be insertable into the adjuster opening of the housing and the adjuster opening of the wedge block to move the wedge block transversely to the longitudinal axis with actuation of the wedge adjuster and to expand a length of the sub rod when actuated one direction and to allow contraction of the length of the sub rod when actuated a second direction different from the first direction; and
a piston rod formed with a connection opening that is configured to align with the connection opening through the second load transfer block of the sub rod, and a distal portion from the piston rod connection opening that is configured to receive a piston.

14. The assembly of claim 13, wherein at least one of the load transfer blocks comprises a swivel end connector comprising a connector collar coupled to the second end portion of the at least one of the load transfer blocks, and a connector member longitudinally coupled and rotationally uncoupled to the connector collar.

* * * * *